United States Patent [19]
Kordts et al.

[11] Patent Number: 5,231,351
[45] Date of Patent: Jul. 27, 1993

[54] MAGNETORESISTIVE SPEED SENSOR PROCESSING CIRCUIT UTILIZING A SYMMETRICAL HYSTERESIS SIGNAL

[75] Inventors: Jürgen Kordts, Norderstedt; Georg Kisters; Michael Ramm, both of Hamburg, all of Fed. Rep. of Germany

[73] Assignee: U.S. Philips Corporation, New York, N.Y.

[21] Appl. No.: 762,526

[22] Filed: Sep. 18, 1991

[30] Foreign Application Priority Data

Sep. 22, 1990 [DE] Fed. Rep. of Germany ....... 4030085

[51] Int. Cl.⁵ .................. G01P 3/481; G01P 3/488; H03K 17/00
[52] U.S. Cl. .................. 324/166; 307/355; 324/173; 324/207.12; 324/207.21
[58] Field of Search ............ 324/207.12, 207.20, 324/207.21, 207.25, 225, 251, 252, 166, 173, 174; 364/565; 328/5; 307/355, 359, 491, 494

[56] References Cited

U.S. PATENT DOCUMENTS

| | | | |
|---|---|---|---|
| 4,359,685 | 11/1982 | Eguchi et al. | 324/207.21 |
| 4,456,840 | 6/1984 | Ide et al. | 307/359 X |
| 4,712,064 | 12/1987 | Eckardt et al. | 324/207.21 |
| 5,043,660 | 8/1991 | Hasegawa | 324/207.21 X |
| 5,055,781 | 10/1991 | Sakakibara et al. | 324/207.12 X |

FOREIGN PATENT DOCUMENTS

| | | |
|---|---|---|
| 0201682 | 11/1986 | European Pat. Off. |
| 2518054 | 11/1976 | Fed. Rep. of Germany |
| 58-182560 | 10/1983 | Japan |
| 60-131421 | 7/1985 | Japan |

OTHER PUBLICATIONS

Valvo Technische Information 861105, "Anwendungen der Magnetfeldsensoren KMZ 10," pp. 1-17, Nov. 5, 1986.

Primary Examiner—Gerard R. Strecker
Attorney, Agent, or Firm—Robert J. Kraus

[57] ABSTRACT

A processing circuit for a magnetoresistive rotary speed sensor (13) or the like having a comparator (11) with switching hysteresis for converting an analog sensor signal into a digital switching signal. An apparatus is provided at the input side of the comparator in order to alternately supply each of the comparator inputs, as a function of the switching signal at the output side of the comparator, symmetrically with a given hysteresis signal as a switching threshold. This apparatus also includes a preamplifier (15) which precedes the comparator non-inverting input and which amplifies the sensor signal, and an offset amplifier (18) of the same construction which precedes the comparator inverting input and which amplifiers an offset signal of a preceding offset network (21). The processing circuit provides a simple, integrable circuit which suppresses offsets and compensates for temperature and supply voltage fluctuations and any spread in tolerances of the circuit components.

18 Claims, 2 Drawing Sheets

MAGNETORESISTIVE SPEED SENSOR PROCESSING CIRCUIT UTILIZING A SYMMETRICAL HYSTERESIS SIGNAL

BACKGROUND OF THE INVENTION

This invention relates to a processing circuit for a magnetoresistive rotary speed sensor or the like having a comparator with switching hysteresis for converting an analog sensor signal into a digital switching signal.

Processing circuits of this kind are used in the field of rotary speed detection for converting mechanically generated rotary speed information into preferably digital, electric signals, notably in applications in an anti-lock system.

The publication "Valvo Technische Information 861105, Anwendungen der Magnetfeldsensoren KMZ 10" describes an arrangement which generates, using a gear wheel and a magnet, a magnetic alternating field which depends on the rotary speed thereof. A rotary speed sensor operating on the basis of the magnetoresistive effect comprises four resistors which depend on the magnetic field and which form a measuring branch so as to generate a resultant electric signal corresponding to the applied steady magnetic field. It is also possible to detect the rotary speed zero. The processing circuit of this circuit arrangement is shown in FIG. 33 of the cited publication and comprises a comparator which converts the bridge signal into a switching signal. Between the non-inverting input and the output of the comparator there is provided a high-ohmic resistor which produces a switching hysteresis in conjunction with the sensor bridge resistor. The offsets caused by various effects, in the sensor signal and in the comparator circuit are eliminated by the configuration of the inverting comparator input so that the potential of the non-inverting input is shifted.

Depending on the distance between the rotary speed sensor and the gearwheel, the magnetic field changes. This measuring-technical drawback opposes the aim to provide manufacturing tolerances that are as large as possible. For correct operation of the arrangement it is necessary that the offset voltages smaller than the useful signal. Because of the direct coupling of the comparator to the sensor, the properties of the sensor have an adverse effect on those of the comparator. The bridge resistors of the rotary speed sensor exhibit a temperature dependency and also a wide spread in resistance. Because the switching hysteresis also depends on these resistors, the hysteresis, unfortunately, is also temperature-dependent and spread-dependent. The same holds true for the offset correction. In the input configuration of the non-inverting input, to a first approximation a constant current is generated which flows through the bridge resistors and hence causes a voltage drop which compensates for the offset. Therefore, the offset compensation is also dependent on the temperature drift and any variations of the rotary speed sensor. Because of the unequally loaded inputs of the comparators, supply voltage fluctuations etc. cause an offset. Furthermore, the comparatively small sensor signals are applied directly to the comparator circuit and, therefore, have a substantial effect on the offset thereof. Moreover, this arrangement is too sensitive with respect to electromagnetic interference signals. These signals reach the sensor via the power lead. When the sensor is balanced, the sensor signal does not exhibit interference signals. Because the half-bridges of the sensor are unequally loaded in respect of RF interferrence radiation, the overall bridge is no longer balanced. Interference signals are conducted further in attenuated form due to the detuning.

From the product disclosure "Differenz-Hall-Sensor mit schaltendem Ausgang TLE 4920 G" published by Siemens, there is known a further arrangement which utilizes two Hall probes. Using a gearwheel, the rotary speed of a shaft is determined. The gearwheel passes the hall probes and detunes a magnetic field generated by a magnet. Consequently, the Hall probes generate different signals, the difference therebetween being a measure of the position of a tooth with respect to the probes, the frequency thereof being dependent on the rotary speed and the number of teeth of the gearwheel. Via an amplifier, this signal is applied to a high-pass filter which eliminates the offset due to temperature, ageing and mechanical construction. What is left is the desirable periodic signal which switches over a subsequent Schmitt trigger. However, vibrations cause interference signals which are suppressed by a switching hysteresis. The high-pass filter imposes a lower limit frequency so that low rotary speeds can no longer be detected and an anti-lock system would no longer be operational. Furthermore, an external capacitor is required which is mounted in the vicinity of the brake disc and which must be designed for the relevent operating circumstances. Brake-induced high temperatures notably lead to increased leakage currents and hence to offset shifts in the processing circuit.

SUMMARY OF THE INVENTION

It is an object of the invention to provide a processing circuit for a magnetoresistive sensor or the like which is insensitive to temperature and supply voltage fluctuations, interference and constructional tolerances, which can be simply integrated monolithically, and in which the sensor properties as it were do not have an effect on the offset and switching hysteresis of the comparator.

This object is achieved in accordance with the invention in that the input side of the comparator is preceded by means for symmetrically applying, in dependence on the switching signal on the output side, a given hysteresis signal as a switching threshold to each of the comparator inputs, one comparator input additionally being preceded by a preamplifier which amplifies the sensor signal, the other comparator input being preceded by an offset amplifier of similar construction which amplifies an offset signal.

In an attractive embodiment of the invention, the preamplifier has a high input resistance and a low output resistance. In a sensor whose reference point is ground, the output signal is preferably present at the non-inverting input of the preamplifier and the ground signal is present at the inverting input thereof. When the sensor comprises a measuring bridge, the difference signal of the measuring branch is preferably present at the inputs of the preamplifier. The preamplifier also has a variable gain so that offsets of the comparator do not have an effect and that temperature-dependent fluctuations of the sensor signals can be compensated for, i.e. the gain can be increased to the same extent as the loss occurring in temperature-dependent sensor sensitivity.

In an attractive and simple version, the preamplifier has a high input resistance and a low output resistance and comprises a differential amplifier circuit consisting of a current source, two transistors and two resistors.

Furthermore, it has a variable gain so that offsets of the comparator do not, as it were, have an effect and that temperature-dependent fluctuations of the sensor signal can be compensated. In this version the difference signal is present between a sensor signal output and ground and the signal of a measuring bridge of the sensor between the inputs of the preamplifier, respectively.

In accordance with the invention, the offset amplifier is connected to the inverting input of the comparator and has the same construction as the preamplifier, and the offset signal which is present at the input side and is generated in an offset network corresponds to the offset signal of the sensor so that the output signals of the preamplifier and the offset amplifier change to the same extent in response to supply voltage drift and other offsets.

In a preferred embodiment of the invention, the means for imposing a hysteresis signal comprise a hysteresis signal source, two summing members, and a switch. One summing member is connected between the output of the preamplifier and the non-inverting input of the comparator. The other summing member is connected between the output of the offset amplifier and the inverting input of the comparator. The switch comprises a control terminal which is connected to the output of the comparator. Via this terminal, the hysteresis signal can be applied alternately to the one and to the other summing member via a connection lead.

The summing members are preferably constructed with the same operational amplifiers and their offset of the same sign can be eliminated by differentiation in the comparator.

In accordance with a preferred, simple version of the invention, the summing members may be identical, each member consisting of one of the resistors of the preamplifier or the offset amplifier so that their offsets of the same sign are eliminated by differentiation in the comparator. The hysteresis signal can be applied to the summing members via the switch.

In accordance with the invention, the switch switches the hysteresis signal from the summing member in the connection lead between the offset amplifier and the comparator to the other summing member when the output signal of the preamplifier is greater than the output signal of the offset amplifier by an amount equal to the hysteresis signal, and in the reverse switching direction when it is smaller by an amount equal to the hysteresis signal, and so on.

In a special embodiment of the invention, the hysteresis signal can be varied in a temperature-dependent manner in order to compensate for the effect of the temperature-dependency of the sensor when the gain of the amplifier is maintained constant.

In a further embodiment of the invention, the preamplifier may be preceded by a high-frequency filter and the processing circuit may be constructed using an integrated technique, for example a monolithic technique.

The preamplifier preceding the comparator in accordance with the invention, the preceding offset amplifier and the symmetrical application of the hysteresis signal to the amplifier outputs also offer the following advantages. The sensor properties and the comparator properties are independent of one another as a result of the use of the preamplifier. The properties of the overall system, notably as regards the offset behaviour, can thus be optimized. Due to the fully identical construction of the preamplifier and the offset amplifier, effects of temperature fluctuations and supply voltage fluctuations are suppressed. Furthermore, due to the symmetrical input of the preamplifier, suitable suppression of interference signals acting on the preamplifier via the supply lead and the sensor is achieved. Gain and switching hysteresis as well as their desirable temperature dependencies can be simply adjusted by variation of the hysteresis signal or the gain of the preamplifier and the offset amplifier. The overall processing circuit can be simply and readily integrated.

BRIEF DESCRIPTION OF THE INVENTION

Some embodiments of the invention now will be described in detail hereinafter with reference to the accompanying drawings, in which:

FIG. 1 shows the construction principle of a processing circuit in accordance with the invention, FIG. 2 shows the construction of a processing circuit as shown in FIG. 1, modified in accordance with the invention, FIG. 3 shows the principle of the cooperation between the preamplifier and offset amplifier output signals and the switching and hyseresis signals as a function of time, and FIG. 4 shows the input and comparator section of an integrated processing circuit.

DESCRIPTION OF THE PREFERRED EMBODIMENTS

Figure 1:
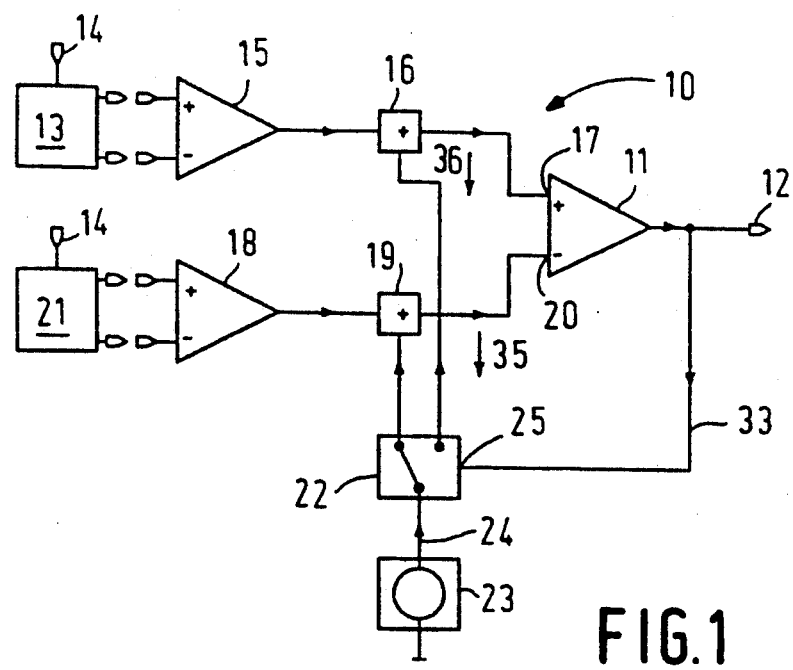

FIG. 1 shows the construction principle of a processing circuit 10 in accordance with the invention which comprises a comparator 11 whose output produces a digital switching signal 12 which suitably corresponds to the analog sensor signal of a sensor 13. The sensor 13 receives a supply voltage 14 and its output side is connected to the input of a preamplifier 15 whose output is connected, via a summing member 16, to the non-inverting input 17 of the comparator 11. The output side of an offset amplifier 18 is connected, via a summing member 19, to the inverting input 20 of the comparator. The input of the offset amplifier 18 receives the output signal of an offset network 21 which is powered by way of the supply voltage 14. The summing members 16 and 19 are alternately connected, via a switch 22 and a connection lead, to a hysteresis source 23 so as to receive a hysteresis signal 24. The switch 22 comprises a control terminal 25 which is connected to the output of the comparator 11 via a lead 33.

Different constructions of the rotary speed sensor 13 are feasible. In one such sensor 13 the output signal is supplied via only one terminal. The reference point is then formed by ground. The non-inverting input of the preamplifier 15 then receives the output signal of the rotary speed sensor 13 and the inverting input of the preamplifier 15 is then connected to ground. Other sensors 13, for examples, magnetorsistive rotary speed sensors comprising a measuring bridge have two signal outputs which are then connected to the + and − inputs of the preamplifier so that the preamplifier amplifies the difference signal. The preamplifier 15 amplifies the very small sensor signal to such an extent that the offsets of the subsequent comparator 11 have only a subordinate effect. As a result of the high input resistance of the preamplifier 15, the sensor 13 is not loaded and hence its properties are not modified. Because of the low output resistance of the preamplifier 15, the properties of the subsequent comparator 11 are not modified either. The offset signal generated in the offset network 21, in synchronism with the sensor signal, arrives at the inputs of the offset amplifier 18, which has exactly the same properties as the preamplifier 15. In the case of drift of the supply voltage 14, of temperature drift or a spread in tolerances of the individual components of the preamplifier 15 and the offset amplifier 18, their output signals vary in the same way. Because the subsequent comparator 11 evaluates only the difference signal, these variations compensate for one another.

Figure 2:
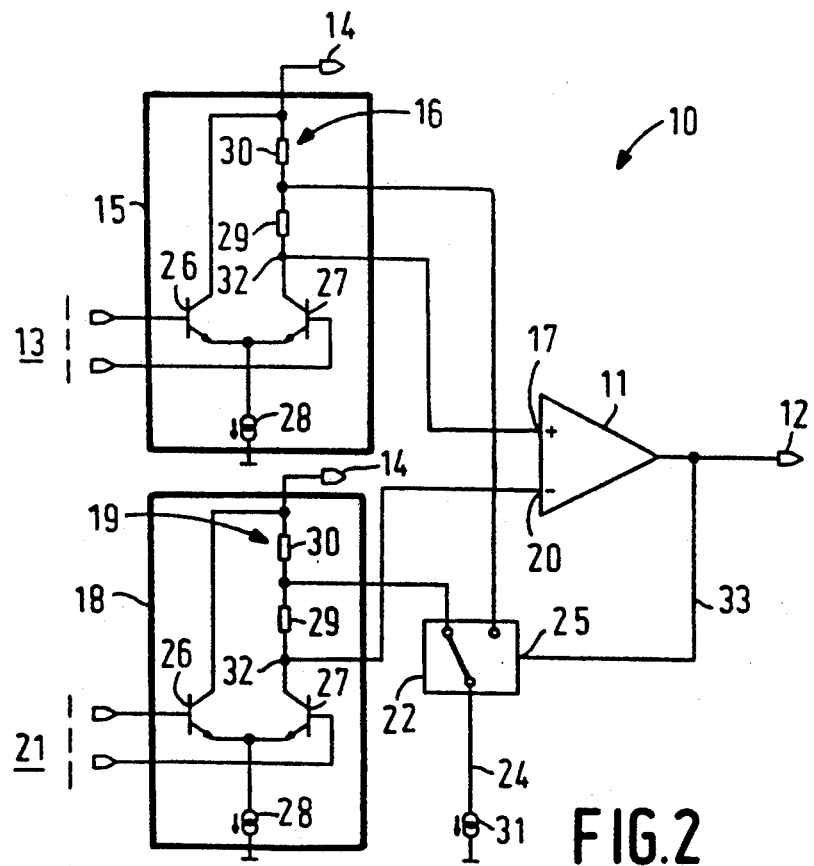

FIG. 2 shows a simple version of the processing circuit 10 in accordance with the invention. The output signal of the sensor 13 (not shown) reaches the inputs of the preamplifier 15 which is constructed, like the offset amplifier 18, as a differential amplifier circuit comprising two similarly connected transistors 26, 27, a current source 28 and also a series resistor 29 and a hysteresis resistor 30. The gain of the amplifiers 15 and 18 is determined by the sum of the resistors 29 and 30 and the current of the current source 28. Because each of the circuits of the amplifiers 15 and 18 must behave exactly identically because of the offset errors, this version is preferably realised using an integrated circuit technique. The inputs of the amplifiers 15 and 18 are connected to a respective base of the transistors 26 and 27. The summing members 16 and 19 in the present processing circuit 10 are integrated by way of the hysteresis resistor 30 of the amplifiers 15 and 18 in a particularly simple manner. According to this version, the summing members 16 and 19 are reduced to summing points at the area where a hysteresis signal 24 is connected in the form of a current source 31 via the switch 22. The hysteresis signal 24 is then formed by the product of the current of the current source 31 and the hysteresis resistor 30. The non-inverting input 17 of the comparator 11 of the present version is connected to a connection point 32 between the series resistor 29 and the transistor 27 of the preamplifier 15. The inverting input 20 of the comparator 11 is connected to the corresponding connection point 32 of the offset amplifier 18. The switching signal 12 is fed back, via a lead 33, to the control terminal 25 of the switch 22. The amplifiers 15 and 18 receive the supply voltage 14.

Figure 3:
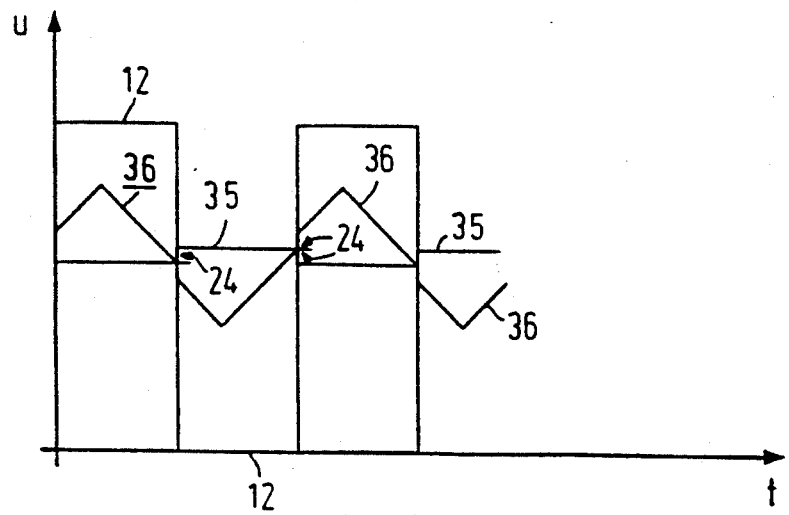

FIG. 3 shows the various switching states, i.e. the voltage variation of the switching signal 12, that on the output of the summing member 16 and that on the output of the summing member 19, as a function of time. It is to be noted that the delta-shaped curve is merely an example and that the shape may also be sinusoidal or otherwise different. Via the summing members 16 and 19, the output signals of the preamplifier 15 and those of the offset amplifier 18 reach the inputs 17 and 20 of the comparator 11, which in turn outputs a switching signal 12 having the value "high" or "low", depending on which signal (35 or 36) is greater. Via the lead 33, the switching signal 12 reaches the switch 22 which applies the hysteresis signal 24 either to the summing member 16 or to the summing member 19.

Assuming that the switching signal 12 is such that the switch 22 applies the hysteresis signal to the summing member 19, the offset signal of the offset amplifier 18 is increased by the hysteresis signal 24. This increased signal is denoted by the reference numeral 35. In order to enable switching of the comparator 11, the output signal of the preamplifier 15 must become greater than the output signal of the offset amplifier 18 increased by the hysteresis signal 24. At that instant the switch 22 switches over and the signal at the output of the summing member 16 is increased by the hysteresis signal 24 and the signal 35 decreases to its original value. The increased signal at the output of the summing member 16 is denoted by the reference numeral 36. In order to enable the comparator 11 to switch back again, the output signal of the preamplifier 15 must be smaller than the output signal of the offset amplifier 18 by an amount equal to the hysteresis signal 24. In other words, after a switching operation, the output signal of the preamplifier 15 must vary in the opposite direction to the amount of the so-called switching hysteresis from the double value of the hysteresis signal 24, until another switching operation takes place. The switching hysteresis thus depends only on the hysteresis signal 24.

The summing members 16 and 19 shown in FIG. 1 can be constructed in known manner, for example, with an operational amplifier. The offsets of the summing members 16 and 19 are eliminated by the differentiation in the comparator 11 when they have the same sign and the same magnitude.

It is often desirable to make the hysteresis signal 24, or the gains of the amplifiers 15 and 18, temperature-independent. For example, the sensitivity of the magnetoresistive sensor known from the cited publication "Technische Informationen . . . " at 150° C. is only half of that at room temperature, so that its output signal is only half as great for otherwise the same circumstances. In the case of small output signals of the sensor, therefore, the hysteresis thresholds at room temperature can be overcome, but not, for example at 150° C., when the hysteresis thresholds are fixed. Therefore, the switching hysteresis is rendered temperature-dependent so that it also decreases to half the value at, for example, 150° C. Another possiblity of correcting the sensitivity loss of this sensor consists of increasing the gain of the amplifiers 15 and 18 to exactly the same extent.

Figure 4:
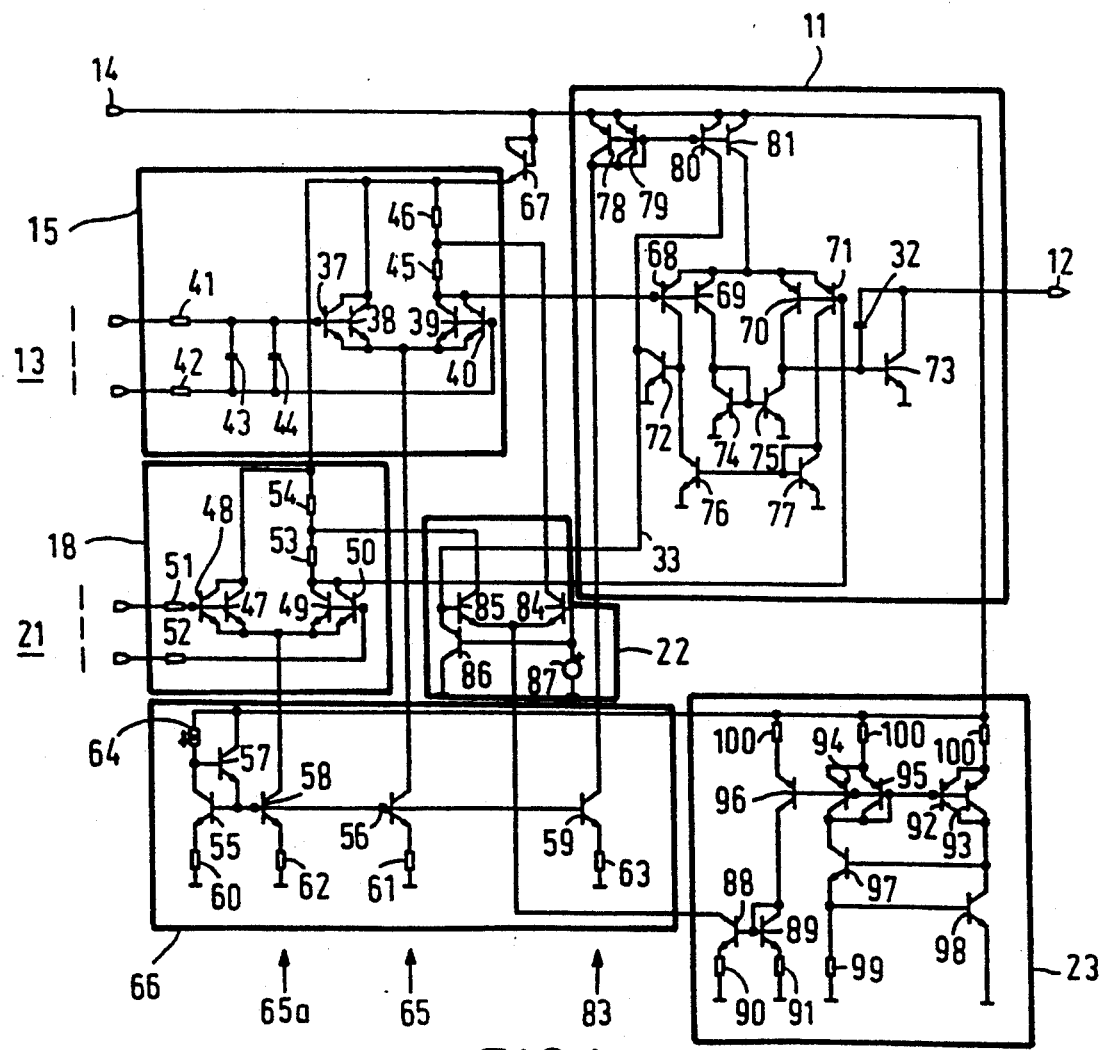

FIG. 4 shows, inter alia, the input and comparator section of an integrated processing circuit 10 for a magnetoresistive sensor 13 comprising a bridge circuit. The preamplifier 15 comprises essentially a differential amplifier circuit, comprising two transistors 37, 38 and 39, 40 per branch and the resistors 46 and 45 in the collector branch of the transistors 39 and 40 as well as resistors 41 and 42 at the inputs with capacitors 43 and 44 connected parallel to the inputs. With the exception of the capacitors, the offset amplifier 18 has exactly the same construction and comprises the transistors 47, 48, 49, 50 and the resistors 51, 52, 53 and 54. The amplifiers 15 and 18 are both the same as described with reference to FIG. 2, with the exception of the input configuration. Because of electromagnetic compatability, the input of the preamplifier 15 comprises a filter consisting of the elements 41, 42, 43 and 44 which suppresses the RF interference signals originating from the sensor 13. In the offset amplifier 18 the elements 51 and 52 are added at the input in order to achieve the same electrical DC properties as in the preamplifier 15.

A current supply means 66, consisting of the transistors 55, 56, 57, 58 and 59 as well as the resistors 60, 61, 62 and 63, supplies the preamplifier 15 as well as the offset amplifier 18 with currents which are derived from a single current source 64 and which, therefore, are comparatively constant with respect to one another. The gains of the preamplifier 15 and the offset amplifier 18 are fixed so as to be temperature-independent and are calculated from the product of the sums of the resistors 45 and 46, or 53 and 54, and the current in the branch 65 or 65a of the current supply means 66, divided by four times the thermal voltage. The branch 65 of the current supply means 66 is associated with the transistor 56.

Because the thermal voltage as well as the resistors 45 and 46 or 53 and 54 have a temperature coefficient, the current in the branch 65 or 65a must have a corresponding opposed temperature coefficient in order to ensure that the gain of the preamplifier 15 and the offset amplifier 18 becomes temperature-independent. The current in the branch of the transistor 55 may originate, for example, from a band gap reference circuit whose locally generated current has exactly the desired temperature coefficient.

The amplifiers 15 and 18 can be connected to the supply voltage 14 of, for example, 5 V via a transistor 67. The transistor 67 ensures that the output signals of the amplifiers 15 and 18 are reduced by the forward voltage (base-emitter voltage) of the transistor 67 so that the subsequent comparator 11 can suitably process the signals which are close to the supply voltage 14. Furthermore, as the temperature increases the forward voltage of the transistor 67 decreases. At the same time the current in the branch 65 increases and ensures an increasing voltage drop across the resistors 45, 46. As a result of these opposing effects, the potentials of the output signals of the amplifiers 15 and 18 remain substantially constant in respect of values in the non-driven state. This is attractive for the subsequent comparator 11 which thus need operate only in a limited (DC) control range. The comparator 11 comprises transistors 68 to 77 as well as transistors 78 to 81 and a capacitor 82. The individual components form a standard double comparator circuit which is powered, via the current mirror (transistors 78 to 81), by the branch 83 of the current supply means 66. The branch 83 is the branch associated with the transistor 59. One output of the comparator 11, at the transistor 73, is connected to a subsequent interface or the like. The other output of the comparator 11, at the transistor 72, is connected to the input of the switch 22 via the lead 33.

The switch 22 consists of transistors 84, 85 and 86, the transistors 84 and 85 being combined so as to form a differential amplifier. A reference voltage 87 is applied to the base of the transistor 84. The base of the transistor 85 is connected to the comparator 11 via the lead 33. Depending on the state of the comparator 11, either the transistor 84 or the transistor 85 is turned on, the transistor 86 preventing complete overdriving. Thus, the hysteresis signal 24 additionally flows either through the resistor 46 or through the resistor 54 of the amplifier 15 or 18, which hysteresis signal is responsible for the switching hysteresis. As has already been described, the switching hysteresis is necessary because of reasons of insensitivity to vibrations. In the present arrangement it has a temperature coefficient so that it drops to approximately one half, for example, at a temperature of 150° C. with respect to room temperature, so that it takes into account the equivalent sensitivity decrease of the sensor 13. The setting is realised via the hysteresis signal 24 which is determined by the current reference 23 connected to the switch 22.

The current reference 23 consists of a current mirror which consists of the transistors 88, 89 and resistors 90, 91 as well as of the so-called base-emitter reference voltage with the transistors 92 to 98 and a resistor 99. The transistors 92 to 96 include a series resistor 100 in the collector-emitter branch. The forward voltage of the transistor 98, having a temperature dependency of −2 mV/K, is present across the resistor 99. Thus, the resistor 99 is traversed by a temperature-dependent current having a temperature coefficient which depends on the temperature dependency of the base-emitter forward voltage and on the temperature coefficient of the resistor 99. This current is mirrored by the transistor 96, the transistors 94, 95 and 92, 93 and reaches the current mirror comprising the transistors 89, 88. The resistors 90, 91 on the one hand adjust the absolute value of the current and on the other hand enable a given degree of variation of the temperature coefficient.

The aspects of the invention disclosed in the foregoing description of the drawing, as well as in the claims, can be used both individually as well as in arbitrary combinations in carrying out the invention in its various embodiments.

We claim:

1. A processing circuit for a magnetoresistive rotary speed sensor which generates an analog sensor signal, said processing circuit comprising: a comparator with switching hysteresis for converting an analog sensor signal into a digital switching signal, means coupled to first and second inputs of the comparator for alternately and symmetrically applying to each of the comparator inputs, dependent upon a digital switching signal at the output side of the comparator, a given hysteresis signal as a switching threshold for the comparator, one comparator input additionally being coupled to a preamplifier which amplifies the analog sensor signal of the rotary speed sensor, the other comparator input additionally being coupled to an offset amplifier similar to the preamplifier and which amplifies an offset signal.

2. A processing circuit as claimed in claim 1, wherein the preamplifier has a high input resistance and a low output resistance, a signal of the rotary speed sensor being supplied to a non-inverting and an inverting input of the preamplifier, and the preamplifier has a variable gain so that offsets of the comparator have no effect and that temperature-dependent fluctuations of the sensor signal are compensated.

3. A processing circuit as claimed in claim 1, wherein the preamplifier has a high input resistance and a low output resistance and comprises a differential amplifier circuit including a current source coupled to two transistors and two resistors coupled to one of said transistors the preamlifier has a variable gain so that effects of offsets of the comparator are minimized and temperature-dependent fluctuations of the analog sensor signal are compensated.

4. A processing circuit as claimed in claims 1 or 2, wherein the offset amplifier is connected to an inverting input of the comparator and has the same construction as the preamplifier, in that the offset signal is present at the input side of the offset amplifier and arises in an offset network and corresponds to the analog sensor signal so that output signals of the preamplifier and the offset amplifier vary in the same sense in response to drift of a supply voltage and other offsets.

5. A processing circuit as claimed in any one of claims 1–3, wherein the means for symmetrically applying a hysteresis signal comprise; a source of hysteresis signal, first and second summing members, each of which is connected in a respective connection between the preamplifier and the comparator and between the offset amplifier and the comparator, and a switch having a control terminal connected to the comparator output and arranged to alternately connect the summing members to the hysteresis signal source.

6. A processing circuit as claimed in claim 5, wherein the summing members have the same construction and comprise an operational amplifier, their offsets of the same sign being eliminated by differentiation in the comparator.

7. A processing circuit as claimed in claim 3, wherein the means for symmetrically applying a hysteresis signal comprise; a source of hysteresis signal, first and second summing members, each of which is connected in a respective connection between the preamplifier and the comparator and between the offset amplifier and the comparator, wherein the summing members are identical and each comprise one of the resistors of the preamplifier and the offset amplifier, their offsets of the same sign being eliminated by differentiation in the comparator, and a switch having a control terminal connected to the comparator output and arranged to alternately connect the summing members to the hysteresis signal source.

8. A processing circuit as claimed in claim 6 wherein the switch switches the hysteresis signal from the summing member of the non-inverting comparator input to the other summing member when the output signal of the preamplifier exceeds the output signal of the offset amplifier by an amount equal to the hysteresis signal and switches it in the reverse direction when said preamplifier signal is smaller than the output signal of the offset amplifier by an amount equal to the hysteresis signal.

9. A processing circuit as claimed in claim 8, wherein the hysteresis signal can be varied in a temperature-dependent manner, with a constant gain of the preamplifier and the offset amplifier, in order to compensate for the effect of any temperature dependency of the rotary speed sensor.

10. A processing circuit as claimed in any one of claims 1-3 wherein the preamplifier input includes a high-frequency filter including two capacitors and two resistors, and wherein the processing circuit comprises an integrated circuit.

11. A processing circuit as claimed in claim 7, wherein the switch switches the hysteresis signal from the summing member of the non-inverting comparator input to the other summing member when the output signal of the preamplifier exceeds the output signal of the offset amplifier by an amount equal to the hysteresis signal and switches it in the reverse direction when said preamplifier signal is smaller than the output signal of the offset amplifier by an amount equal to the hysteresis signal.

12. A circuit for processing an analog speed signal into a digital switching signal comprising:
a preamplifier which receives the analog speed signal,
an offset amplifier similar to the preamplifier and responsive to an offset signal,
a comparator having first and second inputs coupled to respective outputs of the preamplifier and the offset amplifier and having an output at which said digital switching signal is produced, and
means controlled by said switching signal for symmetrically applying a hysteresis signal to said first and second inputs of the comparator in a manner such that the hysteresis signal acts as a switching threshold for the comparator.

13. A processing circuit as claimed in claim 12, wherein said preamplifier comprises a variable gain differential amplifier and said analog speed signal is derived from a measuring bridge which receives an analog sensor signal from a rotary speed sensor.

14. A processing circuit as claimed in claim 13, wherein the circuit of the offset amplifier is the same as the circuit of the preamplifier, said processing circuit further comprising an offset network coupled to an input of the offset amplifier to supply said offset signal thereto, wherein said offset signal corresponds to an offset signal of the preamplifier whereby output signals of the preamplifier and the offset amplifier vary in the same sense in response to certain variations in circuit characteristics thereby to compensate same.

15. A processing circuit as claimed in claim 12, wherein said hysteresis signal applying means comprises:
a source of hysteresis signal,
first and second summing devices coupled in cascade between respective outputs of the preamplifier and the offset amplifier and said first and second inputs of the comparator, respectively,
a controlled switching device coupled between an output of the hysteresis signal source and respective ones of the first and second summing devices, and
means for coupling a control terminal of the switching device to the output of the comparator thereby to alternately switch the hysteresis signal source to the first and second summing devices as a function of the digital switching signal at the output of the comparator.

16. A processing circuit as claimed in claim 15, wherein said preamplifier and said offset amplifier each comprise:
a differential amplifier including first and second transistors each having a first main electrode coupled in common to a current source,
first and second resistors serially connected between a second main electrode of the first transistor and a terminal for a source of DC supply voltage, and wherein
said first and second summing devices comprise the respective first resistors of said serially connected resistors and said preamplifier has a variable gain.

17. A processing circuit as claimed in claim 12, wherein said preamplifier and said offset amplifier are arranged so that the gain of each is independent of temperature, said circuit further comprising means for varying the hysteresis signal as a function of temperature in a manner to compensate any temperature dependency of the analog speed signal.

18. A processing circuit as claimed in claim 12, wherein said analog speed signal is derived from a magnetoresistive rotary speed sensor of an anti-lock brake system.

* * * * *